United States Patent [19]

Doman

[11] 4,329,117
[45] May 11, 1982

[54] WIND TURBINE WITH DRIVE TRAIN DISTURBANCE ISOLATION

[75] Inventor: Glidden S. Doman, Granby, Conn.

[73] Assignee: United Technologies Corporation, Hartford, Conn.

[21] Appl. No.: 142,783

[22] Filed: Apr. 22, 1980

[51] Int. Cl.³ .............................................. F03D 11/02
[52] U.S. Cl. ................................... 416/170 R; 416/41
[58] Field of Search ............ 416/170 A, 170 R, 43 A, 416/43 R, 41 A, 37, 500, 44 A

[56] References Cited

U.S. PATENT DOCUMENTS

| | | | |
|---|---|---|---|
| 2,959,228 | 11/1960 | Larkin et al. | 416/43 |
| 4,110,631 | 8/1978 | Salter | 416/170 A X |
| 4,150,301 | 4/1979 | Bergey | 416/43 A X |
| 4,160,170 | 7/1979 | Harner et al. | 416/41 A |
| 4,219,308 | 8/1980 | Bottrell | 416/43 A |
| 4,239,977 | 12/1980 | Strutman | 290/44 |
| 4,242,050 | 12/1980 | Oakes | 416/170 A |

FOREIGN PATENT DOCUMENTS

| | | | |
|---|---|---|---|
| 814034 | 9/1951 | Fed. Rep. of Germany | 416/43 |
| 837230 | 4/1952 | Fed. Rep. of Germany | 416/43 A |
| 878481 | 1/1943 | France | 416/170 A |
| 937903 | 8/1948 | France | 416/43 A |
| 226400 | 12/1924 | United Kingdom | 416/170 A |
| 245001 | 12/1935 | United Kingdom | 416/170 A |

*Primary Examiner*—Everette A. Powell, Jr.
*Attorney, Agent, or Firm*—John Swiatocha

[57] ABSTRACT

A wind turbine adapted to rotationally drive a load such as an electric power generator 50 includes in the turbine drive train, resiliently mounted gearing 55 which isolates and damps the load from drive train disturbances caused by wind gusts and wind stream dyssemmetry and inherent torsional vibration without assistance from modulation of turbine blade pitch.

5 Claims, 4 Drawing Figures

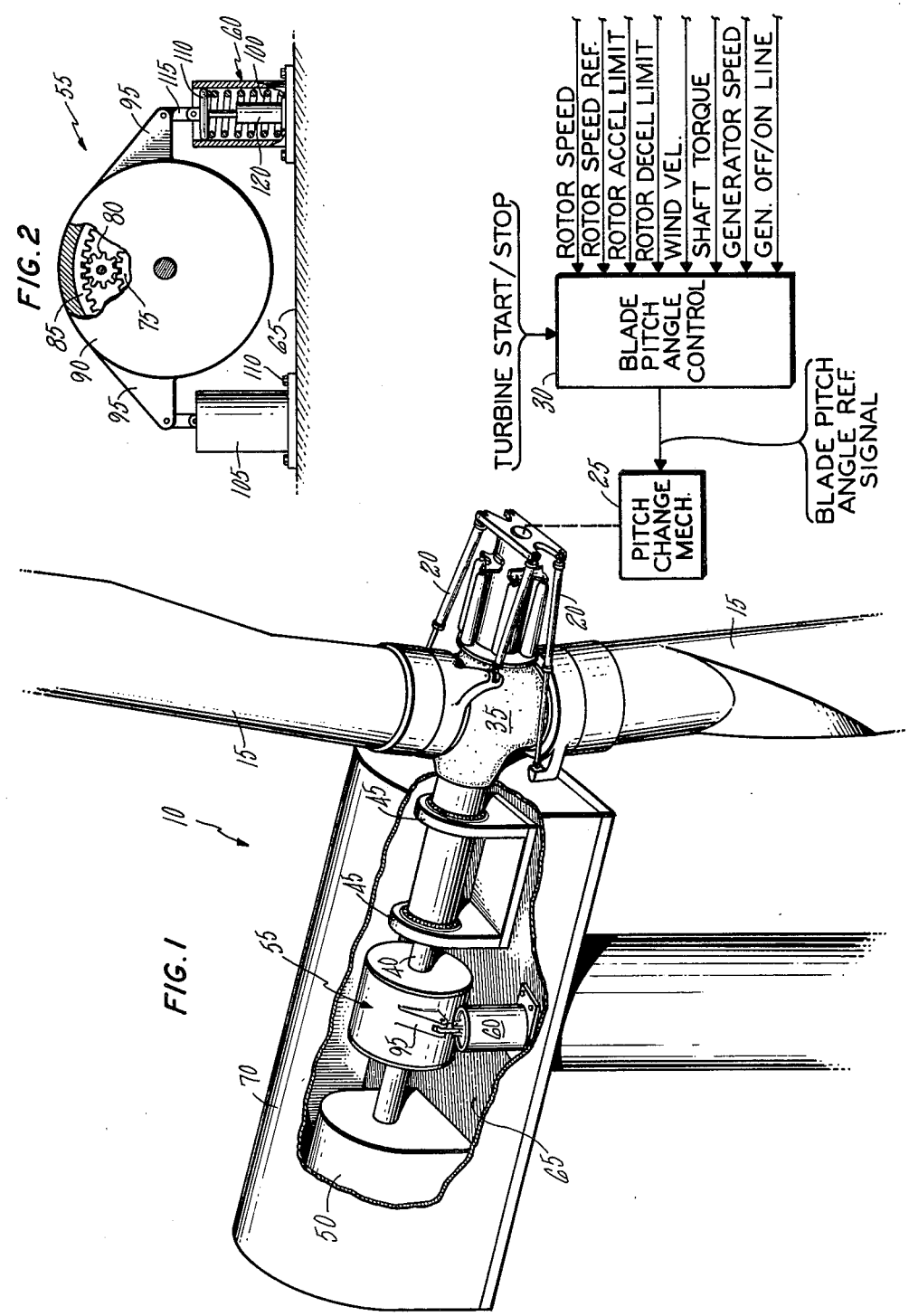

WIND TURBINE WITH DRIVE TRAIN DISTURBANCE ISOLATION

DESCRIPTION

1. Technical Field

This invention relates generally to large wind turbines and more specifically, to such wind turbines provided with variable pitch airfoil blades.

2. Background Art

With a renewed interest in wind turbines as means for generating electric power from wind energy, improvements in the efficiency of such wind turbines are constantly sought. Attempts to achieve enhanced efficiency in large wind turbines have led to the development of wind turbines with variable pitch blades. An example of one type of wind turbine having variable pitch blades may be found in U.S. Pat. No. 4,083,651 to Cheney, Jr. et al, entitled "Wind Turbine with Automatic Pitch and Yaw Control" and assigned to the assignee of the present invention. As set forth in this patent, the pitch of wind turbine blades is adjusted in accordance with the wind conditions for the purpose of controlling the speed of the wind turbine, or in other words, for controlling the amount of wind energy captured by the turbine blades. Blade pitch may also be adjusted to reduce disturbances in the turbine drive train due to for example, wind gusting, wind stream dissymmetry, torsional vibration and the like thereby minimizing any adverse effects on the wind turbine load (electric power generator or the like) from such disturbances. While the pitch of the Cheney, Jr. et al turbine blades is automatically controlled by an arrangement of pivotal pendulum members connected to the blades, various systems have been developed for controlling the pitch of wind turbine blades digitally or by other equivalent methods. An example of a digital blade pitch control system is found in U.S. Pat. No. 4,193,005 to Kos et al, entitled "Multi-Mode Control System for Wind Turbines" and assigned to the assignee of the present invention. This patent in its entirety is incorporated by reference herein.

In the Kos et al control system, the system output is a pitch angle reference signal, determined as a closed loop function of shaft torque as well as various other operating parameters and reference signals. In high wind velocity conditions, i.e. wherein more wind energy is available than required to drive the wind turbine load and the turbine "spills" wind energy from its blades, gusting and wind stream dissymmetry across the turbine rotor cause mechanical disturbances in the turbine drive train which are sensed as sudden changes in shaft torque, whereupon the control system adjusts the pitch of the blades to maintain the shaft torque at a reference level, reducing the amplitude of the disturbance thereby minimizing the effects on the generator of the drive train disturbances. In marginal wind velocity conditions, the Kos et al control system adjusts the pitch of the wind turbine blades to maximize the amount of wind energy captured by the blades for use in driving the generator. Under such marginal conditions, the control system is unable to adjust blade pitch to hold a constant shaft torque, thereby compensating for wind gusts and wind stream dissymmetry. Accordingly, without means for absorbing disturbances such as torque reactions in the wind turbine drive train from wind gusting and wind stream dissymmetry, such disturbances would be conducted through the drive train to the generator with a risk of damage thereof.

Various means for providing absorption of disturbances or shocks to drive trains due to vibration, torque reactions and the like, have been proposed in the prior art. Examples of such shock and vibration absorbing devices are found in U.S. Pat. Nos. 2,844,048 to Bennett et al; 3,146,629 to Schmitter; and 3,460,405 to Simmons. It will be appreciated from an analysis of these patents that the apparatus disclosed therein is neither taught nor suggested as being employed in a wind turbine drive train to absorb shock and vibration while enhancing the wind energy gathering capabilities of a wind turbine under marginal wind conditions.

The only known means for isolating a wind turbine load from drive train disturbances comprises a viscous coupling disposed in the main turbine shaft. It has been determined that such a coupling accounts for a substantial loss in energy delivered to the load and is therefore not a totally acceptable solution to the drive train disturbance problem.

DISCLOSURE OF INVENTION

It is a principal object of the present invention to provide a wind turbine which overcomes the deficiencies of the prior art.

It is another object of the present invention to provide a wind turbine with means for isolation of the turbine load from disturbances in the drive train due to vibration, torque reaction and the like.

It is another object of the present invention to provide such a wind turbine having drive train disturbance isolation wherein the means for achieving such isolation enhances the energy capture capabilities of the turbine blades under marginal wind conditions.

These and other objects which will become more readily apparent from the following detailed description taken in connection with the appended claims and accompanying drawings, are achieved by the wind turbine of the present invention which includes a drive train comprising a plurality of airfoil blades mounted on a hub or rotor adapted to rotatably drive a load such as an electric power generator or alternator. The rotational speed of the rotor is stepped up to a value compatible with the operating speed of the load by gearing resiliently mounted to a non-rotary portion of the turbine such as the nacelle by resilient means such as springs or the like. In the preferred embodiment, the gearing is housed within a casing pivotally supported by a plurality of coil springs, oscillations of the casing on the springs due to the absorption of torque reactions from wind gusting and vibration from inherent drive train resonances being damped by damping means such as a dashpot associated with each mounting spring. The isolation of the generator or alternator from such drive train disturbances by the resiliently mounted gearing frees the blade pitch control system to set blade pitch for maximum energy capture during minimal wind velocity conditions thereby enhancing the performance and overall efficiency of the wind turbine.

The foregoing, and other features and advantages of the present invention, will become more apparent in the light of the following description and accompanying drawing.

BRIEF DESCRIPTION OF THE DRAWINGS

FIG. 1 is an isometric view of a preferred embodiment of the wind turbine of the present invention, with schematic representations of a blade pitch angle control and a pitch change mechanism associated with the turbine, portions of the turbine being broken away to show details of construction;

FIG. 2 is an enlarged elevation of a gear-box employed in the wind turbine shown in FIG. 1, portions of the gear-box and resilient mounts therefor being broken away to show details of construction;

BEST MODE FOR CARRYING OUT THE INVENTION

Figure 3:
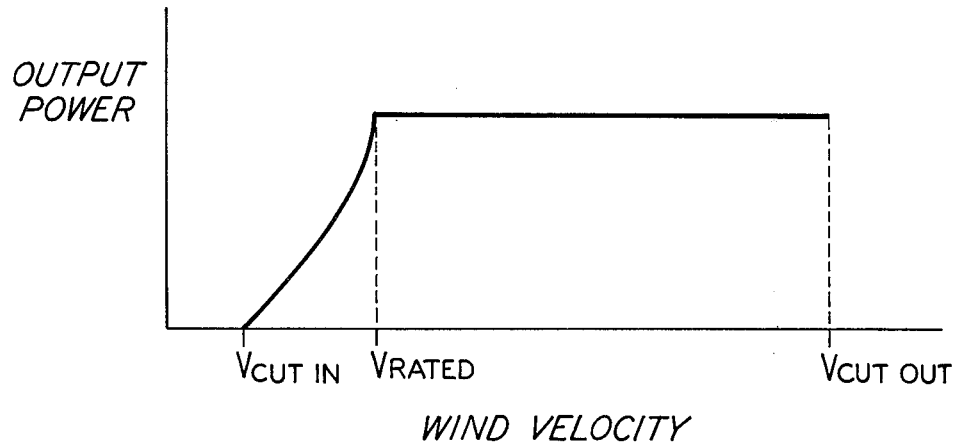
FIG. 3 is a graphical representation of the relationship between turbine output power and wind velocity under conditions of normal turbine operation.

Referring to FIGS. 1 and 2, the wind turbine of the present invention is shown generally at 10 and comprises two or more variable pitch blades 15, the pitch being adjusted by pivoting the blades about their longitudinal axes by hydraulic actuators 20 provided with a controlled flow of hydraulic fluid from pitch change mechanism 25. The pitch change mechanism may be of any known type and forms no part of the present invention. The pitch change mechanism is controlled by blade pitch angle control 30 which calculates a blade pitch angle reference signal in response to input signals of turbine start/stop, turbine rotor speed, rotor speed reference, rotor acceleration limit, rotor deceleration limit, wind velocity, shaft torque, generator speed and generator off/on line. Details of the blade pitch angle control 30 are found in the hereinabove cited Kos et al patent.

Wind turbine 10 includes a drive train which comprises a rotor or hub 35 having blades 15 mounted thereon, the rotor being fixed to a main shaft 40 supported by spaced bearings or pillow blocks 45. The wind energy captured by wind turbine 10 drives load 50 such as a generator or alternator. To step up the speed of shaft 40 to a value compatible with the normal (synchronous) operating speed of generator 50, the drive train is provided with gearing 55 which couples shaft 40 to the generator. To isolate generator 50 from torsional vibration resulting from normal operation of the wind turbine and reaction torque forces resulting from gusting winds and the like (while enhancing the efficiency of the turbine by allowing the blade pitch angle control, at minimal wind conditions, to set the blade pitch angle for maximum wind energy capture) gearing 55 is resiliently fixed to a non-rotatable portion of the turbine by resilient mounts 60 operably connected at one end to the gear-box and at the other end to a floor portion 65 of nacelle 70. While the nacelle, drive train and hub normally pivot in yaw about a vertical yaw axis, such pivoting is not considered rotation as that term is used in the term "non-rotatable portion of the turbine".

Referring to FIG. 3, wherein output power of the wind turbine is plotted against wind velocity, it is seen that below cut-in velocity the turbine is incapable of generating any usable power. At velocities between cut-in and rated, an increase in wind velocity effects an increase in turbine output power. In this region of operation, in order to maintain the generation of useful power by the wind turbine, the amount of wind energy captured by the turbine must be optimized. At wind velocities above rated, more than enough energy is available from the wind to drive the turbine and generator at rated velocity and therefore, the turbine "spills" power from its blades. Thus, it will be appreciated from FIG. 3 that in marginal wind velocity conditions, i.e. wind velocities between cut-in and rated, blade pitch angle control 30 must calculate a turbine blade pitch angle to optimize wind energy capture while at wind velocities above rated and below cut-out, only a portion of the available energy is required to maintain the operation of the turbine at a rated power and the controller will calculate a pitch angle indicative of energy capture required to maintain the output of the generator at rated power. At cut-out velocity, wind velocity is so great that the turbine is shut down to prevent wind damage thereto.

Blade pitch angle control 30, as set forth in the hereinabove cited Kos et al patent, when controlling the pitch angle while the generator is on-line and synchronized with a utility power grid, sets the blade pitch angle in accordance with wind velocity, shaft torque, rotor speed and generator speed. When the generator is on-line, it is essentially locked into its synchronous operating speed and therefore, adjustments in the blade pitch angle reference signal will depend much more heavily on shaft torque and wind velocity than the speed of the rotor and generator. In FIG. 6 of the Kos et al patent, it is seen that in an on-line shaft torque control a time derivative of the blade angle reference signal is obtained by various operations on error signals resulting from a comparison of a reference shaft torque with actual shaft torque and a comparison of rotor speed with generator speed. It will be appreciated that at wind velocities above rated, since more than enough wind energy is available to drive the turbine at rated speed, the blade pitch may be continuously adjusted to compensate for wind gusting and wind stream dissymmetry across the turbine without lowering the power output of the turbine to a value below that required to synchronously drive the generator. Furthermore, from an inspection of the Kos et al patent, it is seen that the on-line shaft torque control circuits of FIG. 6 provide damping of torsional resonance in the drive train under conditions of normal operation.

Still referring to the on-line torque control of the Kos et al patent, when the generator is on-line and the wind turbine is operating at velocities between cut-in and rated, actual shaft torque is of lesser absolute magnitude than a reference torque signal which is subtracted from the actual torque signal thereby resulting in a negative error signal to a dynamic compensation circuit. This negative error results in a negative time derivative of blade pitch angle as the output of the on-line shaft torque controller. When this negative output is integrated in the Kos et al integrator (FIG. 8) the resulting low pitch angle is fed as an input to a circuit implementing maximum and minimum integrator stops; this circuit establishing a minimum pitch angle (for maximum wind energy capture) as the output of the pitch angle control 30. The Kos et al patent discloses that the minimum blade angle is scheduled as a function of rotor speed and wind velocity. Since rotor speed will, for all practical purposes, remain substantially constant when the generator is synchronized with the utility grid, it will be appreciated that between cut-in and rated wind velocities the blade pitch angle is scheduled more or less as an open loop function of wind speed. Therefore, in the region between cut-in and rated velocities, since shaft torque is not an effective basis for modulation of blade pitch, the pitch is not adjustable in response to shaft torque disturbances and vibrations.

Figure 4:
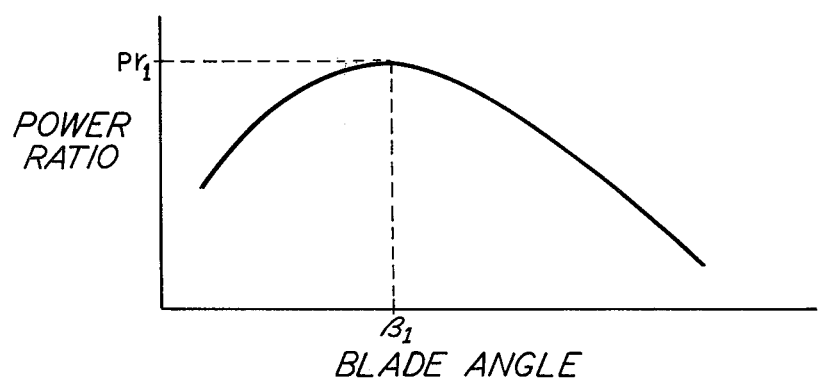
FIG. 4 is a graphical representation of the relationship between turbine power ratio and blade pitch angle for a single arbitrary wind velocity.

Moreover, should blade pitch angle be modulated in response to shaft torque, such modulation would reduce the wind energy capturing capabilities of the turbine which as set forth hereinabove, are required to be optimized in conditions of low wind velocity. Referring to FIG. 4, the turbine power ratio (output power of the turbine/available power of wind stream intercepted by the turbine) is plotted against blade pitch angle. It is seen that the resulting curve peaks at a power ratio of $PR_1$ corresponding to a blade angle of $\beta_1$. Accordingly, it will be appreciated that only one pitch angle corresponds to optimum turbine efficiency and adjustment of pitch angle from that one angle necessarily lowers the efficiency, thereby reducing the range of wind velocities in which the turbine may produce usable power.

To enhance the efficiency of the turbine, the wind turbine of the present invention includes means to isolate the generator from drive shaft disturbances in the operating region between cut-in and rated wind velocites without requiring blade pitch modulation. Referring again to FIGS. 1 and 2, this isolation means comprises the resilient mounting of gearing 55 to a non-rotatable portion of the turbine such as nacelle 70. In the preferred embodiment, gearing 55 comprises a planetary gear system whereby shaft 40 and the rotor of generator 50 may be coaxially disposed. Thus, as shown in FIG. 2 the gearing will comprise a sun gear 75 driving a plurality of planet gears 80 intermeshing with the sun gears and outer ring gear 85. It will, of course, be understood that a plurality of stages of the planetary gearing will generally be required to achieve a desired gear ratio and any number of such stages may be employed without departing from this invention. Furthermore, should it not be required that the generator and turbine shafts be coaxially disposed, any of various other gearing arrangements may be employed.

The rotatable gears are disposed within and supported by a casing 90 in any suitable manner known in the art. Casing 90 includes thereon first and second arms or clevises 95 extending outwardly therefrom, each of the clevises providing a location for the pivotal connection of the casing with resilient mounts 60.

Each of the resilient mounts comprises a spring 100 disposed within and laterally restrained by housing 105 secured to nacelle floor 65 by bolts 110. The spring is disposed between the bottom of housing 105 and a spring retention plate 110 pivotally connected to one end of link 115, the other end of this link being pivotally connected to clevis 95. Accordingly, it will be seen that any pivotal movement of gear casing 90 about the longitudinal axis thereof will be transmitted to springs 100, compressing one of those springs while elongating the other. Thus, any torque reactions of any of the gears within the casing resulting from a drive train disturbance caused by wind gusts or the like and any torsional vibration of the wind turbine rotor due to inherent structural and operating characteristics thereof will be isolated from generator 50 by the springs 100 thereby minimizing the risk of generator damage from such disturbances. Furthermore, it will be appreciated that the resilient connection of the gearing to the nacelle provides such shock absorption or disturbance isolation independently of blade pitch angle setting. Accordingly, in contrast to prior art wind turbines wherein modulation of pitch angle provides the sole means for accommodating such drive train disturbances with an attendant loss of efficiency, in the present invention, turbine efficiency in marginal wind velocity conditions is maintained at an optimum by the blade pitch angle control system, all shock absorption (disturbance isolation) being accommodated by the resilient connection of the gearing with the nacelle.

To dampen oscillations of the gear casing on springs 100 from for example, fundamental torsional vibrations, damping means may be operatively connected to the gearing and turbine nacelle. In the preferred embodiment, such damping means comprises dashpots 120 connected at the cylinders thereof to the nacelle floor at the bottom of housing 105, the dashpot piston being connected at the piston rod thereof to the spring retainer 110 and thus link 115.

Accordingly, it will be appreciated that the present invention provides an improved means of mechanically connecting a wind turbine to a load wherein drive train disturbances from the wind turbine due to wind gusts, wind stream dissymmetry and inherent vibrational characteristics of the system are effectively isolated from the wind turbine load. Moreover, it will be further appreciated that such disturbance isolation is achieved independently of the blade pitch control system at marginal velocity conditions whereby the efficiency of the turbine at such conditions may be optimized.

Although the invention has been shown and described with respect to detailed embodiments thereof, it should be understood by those skilled in the art that various changes and omissions in form and detail may be made therein without departing from the spirit and the scope of the invention. Thus, it will be understood that in accordance with this invention, various other types of springs or resilient members may connect the gearing with any suitable non-rotatable portions of the wind turbine. Similarly, any type of damping means may be employed without departing from this invention. Likewise while the damping means has, in the preferred embodiment been disposed interiorly of, and coaxial to the springs, it will be understood that other equivalent relative dispositions between the springs and damping means may be employed.

I claim:

1. A wind turbine including a drive train comprising a plurality of variable pitch airfoil blades mounted on a rotor adapted to drive a load, blade pitch being controlled by a blade pitch angle control, the output of which at high wind velocity conditions being indicative of blade pitch required for isolation of said load from drive train disturbances while maintaining a desired output power, and at marginal wind velocity conditions, being indicative of blade pitch required for maximizing rotor output power irrespective of drive train disturbances, said wind turbine further including gearing for stepping up the rotational speed of said rotor to a value compatible with the operation of said load, said wind turbine being characterized by:

resilient mounting means independent of, and unconnected to said blade pitch angle control for resiliently mounting said gearing to said wind turbine at a non-rotatable portion thereof, thereby isolating said load from disturbances to said drive train resulting from such conditions as wind gusting, wind stream dissymmetry and inherent drive train resonances and allowing said maximization of rotor output power by said blade pitch angle control irrespective of such disturbances at said marginal wind velocity conditions.

2. The wind turbine of claim 1 further characterized by means for damping oscillations of said gearing on said resilient mounting means.

3. The wind turbine of claim 2 further characterized by said damping means comprising at least one dashpot connecting said gearing to said non-rotatable wind turbine portion.

4. The wind turbine of claim 1 further characterized by said resilient mounting means comprising at least one spring, said wind turbine further including a nacelle, said gearing being disposed in and supported by a casing, said spring connecting said casing to said nacelle.

5. The wind turbine of claim 4 further characterized by said gearing being pivotally and vertically supported within said nacelle at least in part by said spring.

* * * * *